United States Patent
Lais et al.

(10) Patent No.: US 9,569,392 B2
(45) Date of Patent: *Feb. 14, 2017

(54) DETERMINATION OF ONE OR MORE PARTITIONABLE ENDPOINTS AFFECTED BY AN I/O MESSAGE

(75) Inventors: Eric N. Lais, Tillson, NY (US); Steve Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,691

(22) Filed: Apr. 16, 2012

(65) Prior Publication Data

US 2012/0203934 A1    Aug. 9, 2012

Related U.S. Application Data

(63) Continuation of application No. 12/849,958, filed on Aug. 4, 2010.

(51) Int. Cl.
| G06F 13/36 | (2006.01) |
| G06F 13/40 | (2006.01) |
| G06F 13/28 | (2006.01) |

(52) U.S. Cl.
CPC ............. *G06F 13/404* (2013.01); *G06F 13/28* (2013.01); *G06F 13/36* (2013.01); *G06F 2213/0058* (2013.01)

(58) Field of Classification Search
USPC ........... 710/36, 52, 306, 308, 310, 313–315; 709/212, 215, 216
See application file for complete search history.

(56) References Cited

U.S. PATENT DOCUMENTS

| 6,108,739 A | 8/2000 | James et al. |
| 6,263,393 B1 | 7/2001 | Funaya et al. |

(Continued)

FOREIGN PATENT DOCUMENTS

| CN | 1983185 A | 6/2007 |
| EP | 871129 A2 | 10/1998 |

(Continued)

OTHER PUBLICATIONS

The Price of Safety: Evaluating IOMMU Performance, Ben-Yehuda et al., Jun. 2007.*

(Continued)

*Primary Examiner* — Khanh Dang
(74) *Attorney, Agent, or Firm* — Brian F. Russell; Steven L. Bennett

(57) ABSTRACT

A data processing system includes a processor core, a system memory including a first data structure including a plurality of entries mapping requester identifiers (IDs) to partitionable endpoint (PE) numbers, and an input/output (I/O) subsystem including a plurality of PEs each having an associated PE number, where each of the plurality of PEs including one or more requesters each having a respective requester ID. An I/O host bridge, responsive to receiving an I/O message including a requester ID and an address, determines a PE number by reference to a first entry from the first data structure, and responsive to determining the PE number, accesses a second entry of the second data structure utilizing the PE number as an index and validates the address by reference to the accessed entry in the second data structure. The I/O host bridge, responsive to successful validation, provides a service indicated by the I/O message.

17 Claims, 9 Drawing Sheets

(56) References Cited

U.S. PATENT DOCUMENTS

| | | |
|---|---|---|
| 6,330,631 B1 | 12/2001 | Crosland |
| 6,405,276 B1 | 6/2002 | Chen et al. |
| 6,611,891 B1 | 8/2003 | Hewitt et al. |
| 6,618,782 B1 | 9/2003 | Gulick et al. |
| 6,629,162 B1* | 9/2003 | Arndt et al. .............. 710/28 |
| 6,643,727 B1* | 11/2003 | Arndt et al. .............. 710/314 |
| 6,647,453 B1 | 11/2003 | Duncan et al. |
| 6,941,398 B2 | 9/2005 | Lai et al. |
| 6,983,339 B1 | 1/2006 | Rabe et al. |
| 7,136,954 B2 | 11/2006 | Check et al. |
| 7,293,129 B2* | 11/2007 | Johnsen et al. .............. 710/313 |
| 7,315,911 B2 | 1/2008 | Davies et al. |
| 7,571,273 B2* | 8/2009 | Boyd et al. .............. 710/316 |
| 7,574,536 B2* | 8/2009 | Johnsen et al. .............. 710/22 |
| 7,581,033 B2 | 8/2009 | Ebersole et al. |
| 7,660,933 B2 | 2/2010 | Wang |
| 8,200,875 B2 | 6/2012 | Kanaya |
| 8,261,128 B2 | 9/2012 | Lais et al. |
| 8,495,271 B2 | 7/2013 | Lais et al. |
| 8,521,939 B2 | 8/2013 | Lais et al. |
| 8,549,202 B2 | 10/2013 | Lais et al. |
| 2003/0097514 A1 | 5/2003 | Ennis et al. |
| 2004/0073738 A1 | 4/2004 | Kessler et al. |
| 2006/0010276 A1* | 1/2006 | Arndt et al. .............. 710/305 |
| 2006/0010277 A1 | 1/2006 | Arndt et al. |
| 2006/0179195 A1* | 8/2006 | Sharma et al. .............. 710/123 |
| 2006/0242332 A1* | 10/2006 | Johnsen et al. .............. 710/22 |
| 2007/0136554 A1* | 6/2007 | Biran et al. .............. 711/203 |
| 2008/0091855 A1* | 4/2008 | Moertl et al. .............. 710/52 |
| 2008/0126617 A1 | 5/2008 | Brownlow et al. |
| 2008/0126648 A1 | 5/2008 | Brownlow et al. |
| 2009/0106475 A1* | 4/2009 | Arndt et al. .............. 710/311 |
| 2009/0144462 A1* | 6/2009 | Arndt et al. .............. 710/23 |
| 2009/0144508 A1* | 6/2009 | Freimuth et al. .............. 711/145 |
| 2011/0153893 A1 | 6/2011 | Foong et al. |

FOREIGN PATENT DOCUMENTS

| | | |
|---|---|---|
| JP | 09073436 A | 3/1997 |
| JP | 11232213 A | 8/1999 |
| JP | 2002014878 A | 1/2002 |
| JP | 2002269029 A | 9/2002 |
| JP | 2004030161 A | 1/2004 |
| WO | 9941671 A1 | 8/1999 |

OTHER PUBLICATIONS

IOMMU, <http://en.wikipedia.org/wiki/IOMMU>, retrieved Jun. 20, 2012.*

U.S. Appl. No. 12/850,008 entitled "Interrupt Source Controller With Scalable State Structures"; Notice of Allowance dated May 24, 2013 (28 pg.).

U.S. Appl. No. 12/850,040 entitled "Injection of I/O Messages"; Notice of Allowance dated Jan. 22, 2013.

U.S. Appl. No. 13/447,818 entitled "Injection of I/O Messages"; Notice of Allowance dated Jan. 22, 2013.

U.S. Appl. No. 12/849,980 entitled "Determination via an Indexed Structure of One or More Partitionable Endpoints Affected by an I/O Message"; Final office action dated Jan. 4, 2013.

U.S. Appl. No. 12/850,008 entitled "Interrupt Source Controller With Scalable State Structures"; Non-final office action dated Oct. 25, 2012.

Chaggoya-Garzon, Alexandre; Rousseau, Frederic; Petrot, Frederic; "Multi-Device Driver Synthesis Flow for Heterogeneous Hierarchical Systems," Digital System Design (DSD), 2012 15th Euromicro Conference on, pp. 389-396, Sep. 5-8, 2012.

"IEEE Standard for High Performance Serial Bus Bridges," IEEE Std 1394, Jan. 2004, pp. 0_1-161, 2005. (58 pg.).

"NN84014259: Flow Control Technique for Local Networks of Interconnected Token Rings", Jan. 1, 1984, IBM, IBM Technical Disclosure Bulletin, vol. 26, Issue 8, pp. 4259-4262.

* cited by examiner

DETERMINATION OF ONE OR MORE PARTITIONABLE ENDPOINTS AFFECTED BY AN I/O MESSAGE

This application is a continuation of U.S. patent application Ser. No. 12/849,958 entitled "DETERMINATION OF ONE OR MORE PARTITIONABLE ENDPOINTS AFFECTED BY AN I/O MESSAGE" by Eric N. Lais et al. filed Aug. 4, 2010, the disclosure of which is hereby incorporated herein by reference in its entirety for all purposes.

CROSS-REFERENCE

The present application is related to the following copending patent applications, which are assigned to the assignee hereof, filed on even date herewith, and incorporated herein by reference in their entireties:
U.S. patent application Ser. No. 12/849,925;
U.S. patent application Ser. No. 12/849,980;
U.S. patent application Ser. No. 12/850,008; and
U.S. patent application Ser. No. 12/850,040.

BACKGROUND OF THE INVENTION

1. Technical Field

The present invention relates in general to data processing, and in particular, to input/output (I/O) in a data processing system.

2. Description of the Related Art

A data processing system may include multiple processing elements and multiple input/output adapters (IOAs) to support connections to communication networks, storage devices and/or storage networks, and peripheral devices. In such data processing systems, the hardware resources of the data processing system may be logically partitioned into multiple, non-intersecting sets of resources, each controlled by a respective one of multiple possibly heterogeneous operating system instances. The operating systems concurrently execute on this common hardware platform in their respective logical partitions (LPARs) under the control of system firmware, which is referred to as a virtual machine monitor (VMM) or hypervisor. Thus, the hypervisor allocates each LPAR a non-intersecting subset of the resources of the data processing system, and each operating system instance in turn directly controls its distinct set of allocable resources, such as regions of system memory and IOAs.

In any environment including multiple IOAs, it is desirable to isolate IOAs so that each IOA can only obtain access to the resources allocated to it. Isolating IOAs promotes reliability, availability and serviceability of the data processing system, and is especially important in environments supporting hardware virtualization (or logical partitioning), so that IOAs can be individually allocated to different logical partitions (LPARs) and so that any IOA errors be isolated to the particular partition to which the IOA is allocated. For example, for Peripheral Component Interconnect (PCI) buses, if an IOA in one LPAR activates the System Error (SERR) signal, the system must make the SERR signal visible to all other LPARs absent some additional control. Making I/O errors visible across LPAR boundaries requirement is, of course, contrary to the definition and intent of logical partitioning.

One solution that addresses the partitioning problem with PCI errors is to require assignment of all IOAs connected to one PCI Host Bridge (PHB) to the same LPAR partition. However, this restriction mandates a high resource granularity for IOAs that is not very useful or flexible. Ideally, IOAs should be allocable to different LPARs regardless of the PHB to which the IOA is connected. Alternative solutions include the use of specially designed bridge chips external to the PHBs as described in U.S. Pat. No. 6,643,727 or incorporating additional logic and data structures to enforce partitioning between IOAs in differing LPARs within PHBs as described in U.S. Pat. No. 7,398,427.

As also appreciated by the present disclosure, it would be desirable to reduce the size of data structures within PHBs utilized in handling routine messages, such as DMA messages and I/O error message.

SUMMARY OF THE INVENTION

In at least one embodiment, a data processing system includes a processor core, a system memory including a first data structure including a plurality of entries mapping requester identifiers (IDs) to partitionable endpoint (PE) numbers, and an input/output (I/O) subsystem including a plurality of PEs each having an associated PE number, where each of the plurality of PEs including one or more requesters each having a respective requester ID. An I/O host bridge, responsive to receiving an I/O message including a requester ID and an address, determines a PE number by reference to a first entry from the first data structure, and responsive to determining the PE number, accesses a second entry of the second data structure utilizing the PE number as an index and validates the address by reference to the accessed entry in the second data structure. The I/O host bridge, responsive to successful validation, provides a service indicated by the I/O message.

DETAILED DESCRIPTION OF ILLUSTRATIVE EMBODIMENT

Figure 1:
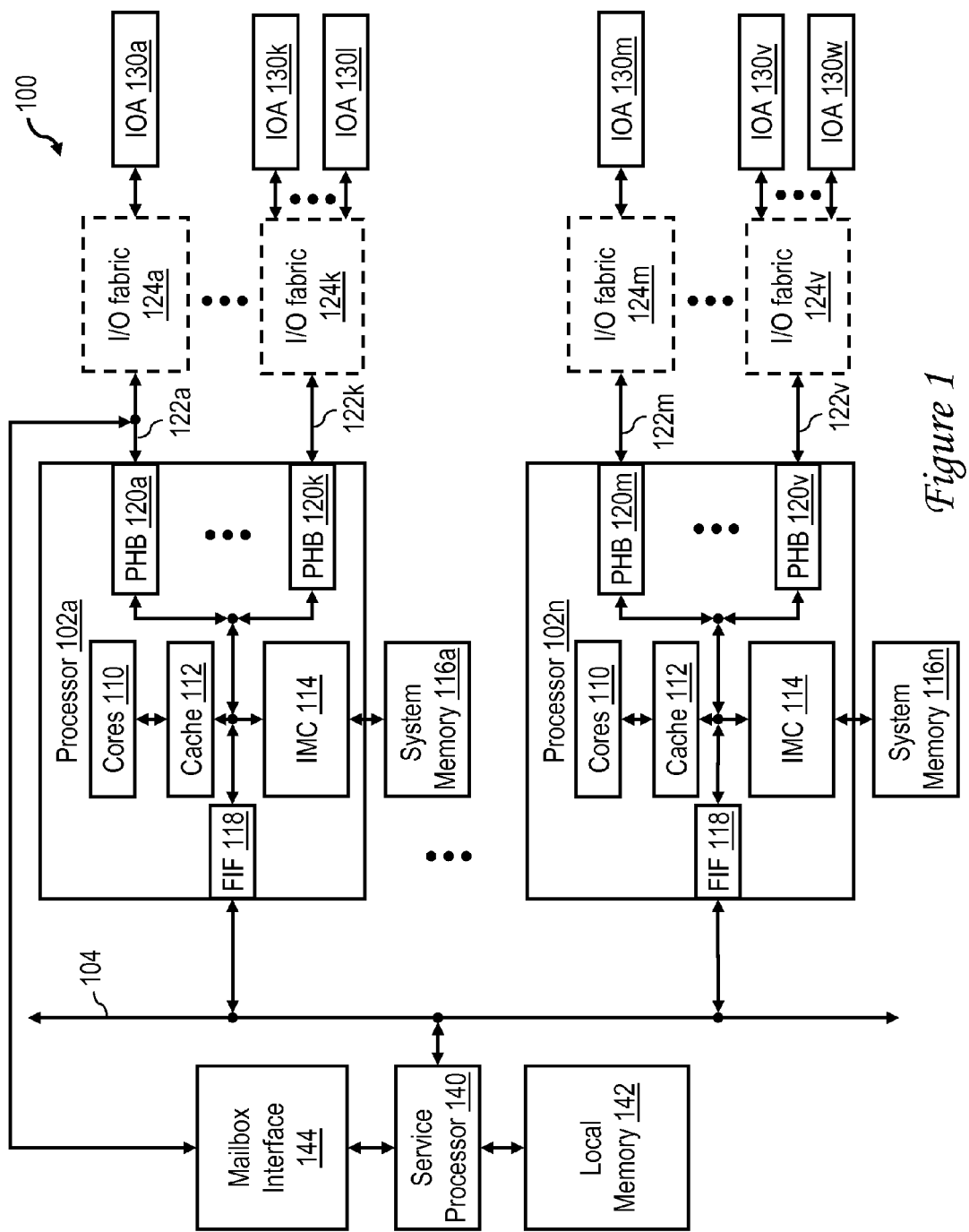
FIG. 1 is a high level block diagram of an exemplary data processing system in accordance with one embodiment.

With reference now to the figures, and in particular with reference to FIG. 1, there is depicted a high level block diagram of an exemplary data processing system 100 in accordance with one embodiment. In some embodiments, data processing system 100 may be, for example, a symmetric multiprocessor (SMP) system including a plurality of processors 102*a*-102*n*, each coupled for communication to a system fabric 104, which may include one or more bused or switched communication links. For example, data processing system 100 may be implemented with an IBM eServer, a product line of International Business Machines Corporation of Armonk, N.Y. In alternative embodiments, a data processing system with a single processor 102 may be utilized.

In the depicted embodiment, each processor 102 is preferably realized as a single integrated circuit chip having a substrate in which semiconductor circuitry is fabricated as is known in the art. As shown, processor 102 includes a plurality of processor cores 110 that process data through the execution and/or processing of program code, which may include, for example, software and/or firmware and associated data, if any. Processor 102 further includes cache memory 112 providing one or more levels of relatively low latency temporary storage for instructions and data retrieved from lower levels of the data storage hierarchy. In addition, processor 102 includes an integrated memory controller 114 that controls access to an associated one of off-chip system memories 116.

Each processor 102 further includes a fabric interface (FIF) by which processor 102 communicates with system fabric 104, as well as one or more (and preferably multiple) host bridges supporting input/output communication with various input/output adapters (IOAs) 130. In the depicted embodiment, all of the host bridges are implemented as Peripheral Component Interconnect (PCI) host bridges (PHBs) 120, but in other embodiments the host bridges may implement one or more additional or alternative I/O bus standards.

PHBs 120*a*, 120*k*, 120*m* and 120*v* provide interfaces to PCI local buses 122*a*, 122*k*, 122*m* and 122*v*, respectively, to which IOAs 130, such as network adapters, storage device controllers, peripheral adapters, etc., may be directly connected or indirectly coupled. For example, PCI IOA 130*a* is coupled to PCI local bus 122*a* optionally through an I/O fabric 124*a*, which may comprise one or more switches and/or bridges. In a similar manner, PCI IOAs 130*k* and 130*l* are coupled to PCI local bus 122*k* optionally through an I/O fabric 124*k*, PCI IOA 130*m* is coupled to PCI local bus 122*m* optionally through I/O fabric 124*m*, and PCI IOAs 130*v* and 130*w*, which may comprise, for example, a display adapter and hard disk adapter, are coupled to PCI local bus 122*v* optionally through I/O fabric 124*v*.

Data processing system 100 further includes a service processor 140 that manages the boot process of data processing system 100 and thereafter monitors and reports on the performance of and error conditions detected in data processing system 100. Service processor 140 is coupled to system fabric 104 and is supported by a local memory 142, which may include volatile (e.g., dynamic random access memory (DRAM)) and non-volatile memory (e.g., non-volatile random access memory (NVRAM) or static random access memory (SRAM)). Service processor 140 is further coupled to a mailbox interface 144 through which service processor 140 communicates I/O operations with PCI bus 122*a*.

Those of ordinary skill in the art will appreciate that the architecture and components of a data processing system can vary between embodiments. For example, other devices and interconnects may alternatively or additionally be used. Accordingly, the exemplary data processing system 100 given in FIG. 1 is not meant to imply architectural limitations with respect to the claimed invention.

Figure 2:
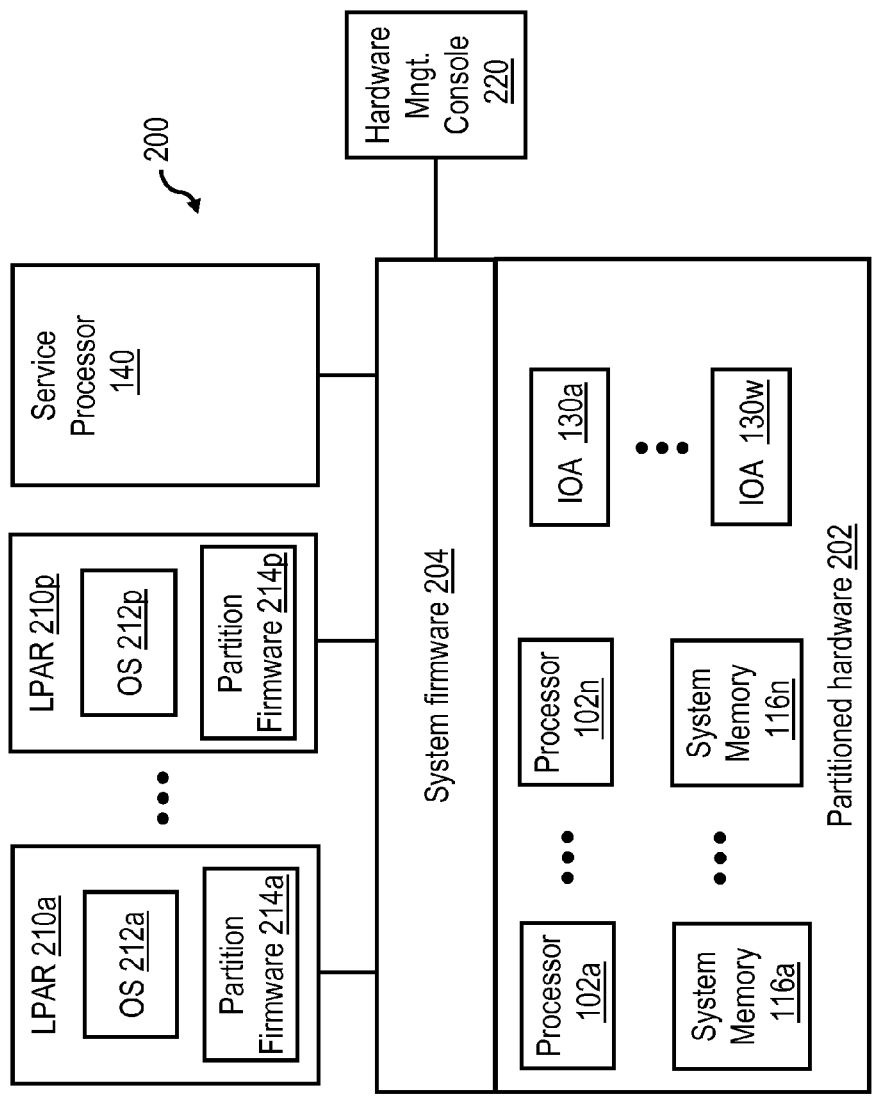
FIG. 2 is a logical view of a data processing system showing the hardware and software resources of the data processing system partitioned into multiple concurrently executing logical partitions (LPARs)

Referring now to FIG. 2, there is depicted a logical view of a data processing system 200 showing the hardware and software resources of the data processing system partitioned into multiple logical partitions (LPARs). Data processing system 200 may have, for example, the same components and/or architecture as data processing system 100 in FIG. 1 and accordingly identifies common components with like reference numerals.

Data processing system 200 has a collection of partitioned hardware 202, including processors 102*a*-102*n*, system memories 116*a*-116*n* and IOAs 130*a*-130*w*. Partitioned hardware 202 may of course include additional unillustrated components, such as additional volatile or nonvolatile storage devices, ports, bridges, switches, etc. The hardware components comprising partitioned hardware 202 (or portions thereof) can be assigned to various ones of logical partitions (LPARs) 210*a*-210*p* in data processing system 200 by system firmware 204, also referred to herein as a virtual machine monitor (VMM) or hypervisor. System firmware 204 supports the simultaneous execution of multiple independent operating system instances by virtualizing the partitioned hardware of data processing system 200.

In addition to the hardware resources allocated by system firmware 204, each of LPARs 210*a*-210*p* includes a respective one of multiple concurrently executed operating system instances 212*a*-212*p*. In various embodiments, operating system instances 212*a*-212*p*, which may include, for example, instances of Linux, AIX and/or Windows, may be homogeneous or heterogeneous. Each LPAR 210 may further include unillustrated application programs, as well as a respective instance of partition firmware 214, which may be implemented, for example, with a combination of initial boot strap code, IEEE-1275 Standard Open Firmware, and runtime abstraction software (RTAS). When LPARs 210*a*-210*p* are instantiated, a copy of boot strap code is loaded onto partitions 210*a*-210*p* by system firmware 204. Thereafter, system firmware 204 transfers control to the boot strap code, which in turn loads the open firmware and RTAS. The processor(s) 102 assigned to each LPAR 210 then execute the partition firmware 214 of that LPAR 210 to bring up the LPAR 210 and initiate execution of the OS instance 212.

In the logically partitioned environment depicted in FIG. 2, service processor 140 can be used to provide various services, such as processing of errors in LPARs 210*a*-210*p*. These services may also function as a service agent to report errors back to a system administrator or vendor of data processing system 200. Operation of the different LPARs 210 may further be controlled through a hardware management console 220. In at least one embodiment, hardware management console 220 can be implemented as a separate data processing system from which a system administrator may perform various functions within data processing system 200 including creating and destroying LPARs 210, as well as reallocating hardware and software resources among LPARs 210.

In a logical partitioned environment such as that depicted in FIG. 2, it is not permissible for the hardware or software resources in one LPAR 210 to consume the resources of or affect the operations in another LPAR 210. Furthermore, to be useful, the assignment of resources to LPARs 210 needs to be fine-grained. For example, it is often not acceptable to assign all IOAs 130 under a particular PHB 120 to the same partition, as that will restrict configurability of the system, including the ability to dynamically reallocated resources between partitions. Accordingly, PHBs 120 are able to assign resources, such as individual IOAs 130 (or portions thereof) to different LPARs 210 while preventing the assigned resources from accessing or affecting the resources of other LPARs 210.

To support such isolation between the resources of different LPARs 210, the I/O subsystem of a data processing system is subdivided into multiple partitionable endpoints. A "partitionable endpoint" or "PE" is defined herein as any component or subcomponent of an I/O subsystem that can be allocated to an LPAR independently of any other component or subcomponent of the I/O subsystem. For example, some PEs may comprise a plurality of IOAs and/or I/O fabric components that function together and, thus, should be allocated as a unit to a single LPAR. Another PE, however, may comprise a portion of a single IOA, for example, a separately configurable and separately assignable port of a multi-port IOA. In general, a PE will be identified by its function rather than by its structure.

Figure 3:
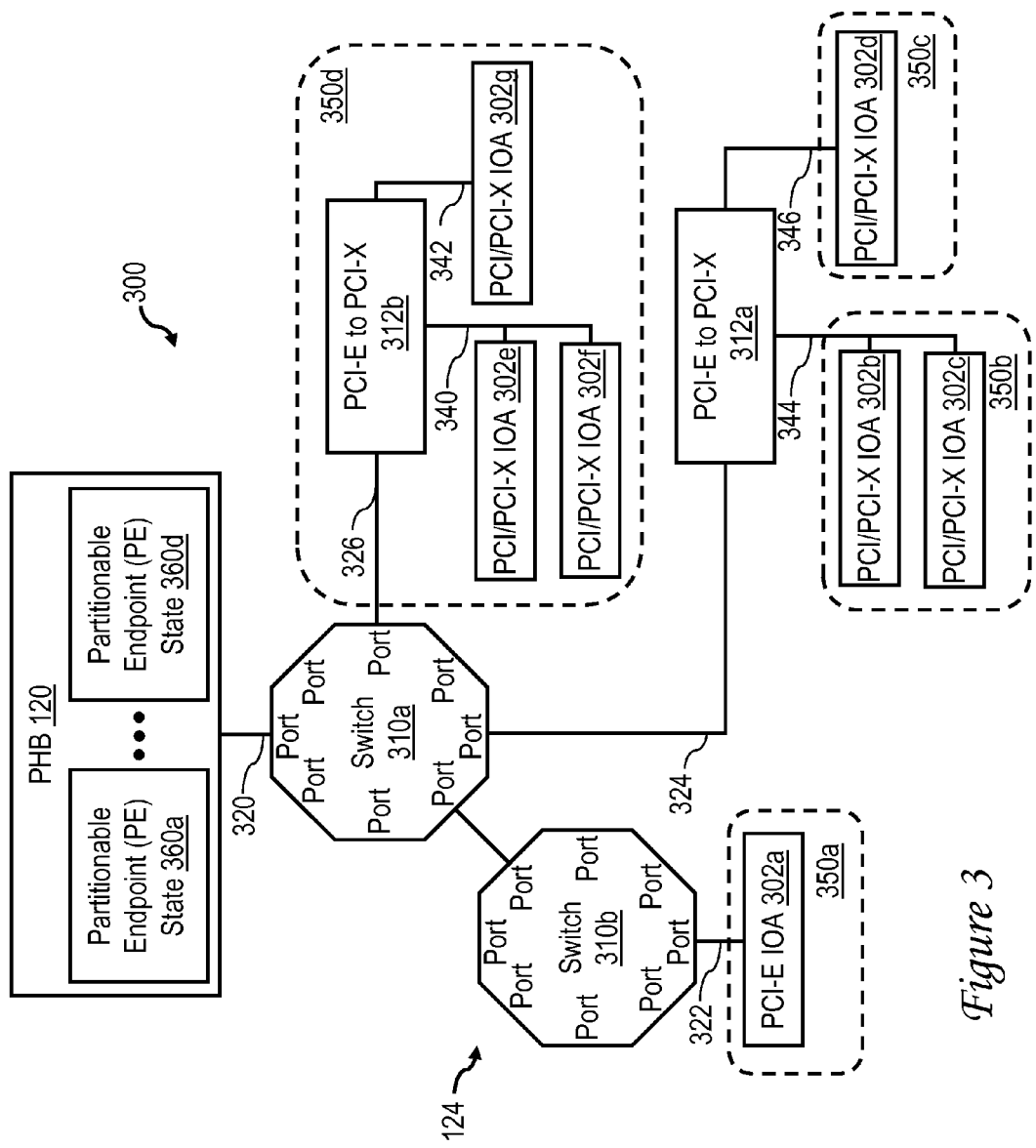
FIG. 3 illustrates an I/O subsystem that provides I/O resource isolation in a data processing system in accordance with one embodiment.

Referring now to FIG. 3, there is depicted a block diagram of at least a portion of the I/O subsystem 300 of a logically partitioned data processing system, such as data processing system 100 of FIG. 1, which exhibits resource isolation between LPARs 210 in accordance with one embodiment.

In the depicted embodiment, I/O subsystem 300 includes a PHB 120 coupled to a plurality of IOAs 302a-302g through an I/O fabric 124. I/O fabric 124 in turn includes switches 310a, 310b, PCI-Express (PCI-E) buses 320, 322, 324 and 326, PCI bridges 312a and 312b, and secondary buses 340, 342, 344 and 346.

As further shown in FIG. 3, system firmware 204 groups various components of I/O subsystem 300 to form a plurality of PEs 350a-350d that are each independently assignable to any of the LPARs 210 of the data processing system. In the given example, PE 350a and PE 350c each comprise a single IOA, namely, IOAs 302a and 302d, respectively. PE 350b, in contrast, comprises two IOAs 302b and 302c that must be assigned to the same LPAR 210. PE 350d comprises three IOAs 302e, 302f and 302g and PCI bridge 312b, which function together as a PE and therefore must be assigned to the same LPAR 210. As noted previously, in other embodiments, a PE may include only a portion (e.g., one or more ports) of an IOA.

In I/O subsystem 300, the respective state of each PE, referred to herein as the partitionable endpoint state, is maintained in the associated PHB 120. Thus, for example, PHB 120 of I/O subsystem 300 includes partitionable endpoint state registers 360a-360d, which correspond to and indicate the states of PEs 350a-350d, respectively.

System firmware 204 assigns each PE one or more domain numbers (or requester IDs (RIDs)) that associate its component(s) with that PE. In an exemplary embodiment, the domain number assigned each PE comprises a plurality of fields that can further be used to differentiate between I/O components in the PE. For example, these fields may include:

Bus number (Bus) field: provides the highest level of division between I/O resources, with each bus under a PHB having a unique bus number.

Device number (Dev) field: provides an intermediate level of division between I/O resources, with each IOA on a given bus having a different device number.

Function number (Func) field: provides the lowest level of division between I/O resources, with each distinct function of an IOA having a different function number.

As will be appreciated, the domain number (or RID) supports the division of I/O resources down to the lowest level of I/O functionality. For example, the domain number allows separate functions of a multiple function IOA to be differentiated. In data processing systems that do not require such a fine granularity, the domain number can be defined by the Bus field alone, allowing differentiation between the PEs connected to the same PHB, or by the Bus field together with either the Dev field or the Func field to permit differentiation between IOAs of a PE or differentiation between functions of an IOA in a PE that contains a multiple function IOA. The sparseness of the domain number space consisting of the Bus, Bus/Dev, or Bus/Dev/Func fields makes it desirable in many cases to condense the domain number space defined by these fields to something less sparse for internal usage by the PHB 120.

Among the isolation functionalities included in PHB 120 of FIG. 3 is the capability to isolate PE error domains. In logically partitioned data processing systems, different PEs may be assigned to different LPARs. Accordingly, PHBs 120 enable an error occurring in one PE to be isolated to the particular LPAR to which the PE is assigned. More particularly, each PHB 120 includes the capability of stopping I/O operations to and from a PE when an error is detected (referred to as the Stopped state). The stopping of I/O operations is preferably accomplished in such a way that:

1. The PE is prevented from completing an I/O operation in error,
    a. such that the PE does not propagate an error to any LPAR, and
    b. such that a requester of the I/O operation does not use erroneous data.
2. The stopping of operations should appear to a device driver to be isolated to just that device driver.
3. Software (at the device driver level or above) for one PE does not introduce an error that can cause another PE to enter the Stopped state.
4. Fault information for problem determination can be captured after the Stopped state Occurs.
5. Firmware can access the configuration space below the PHB when any or all of the PEs are in the Stopped state.

In order to achieve error handling in accordance with these criteria, each PHB preferably provides isolation functionality that identifies a particular error domain for an I/O configuration operation. In a preferred embodiment, the configuration operation error domain capability is enabled by implementing a configuration PE number field in a register of the PHB, which field can be set by the system firmware. In addition, in a preferred embodiment, each PHB determines one or more PE numbers affected by an I/O message and routes the I/O message to only software specific to controlling those PE(s).

In addition to providing effective isolation functionality, it is also desirable to reduce the size of data structures within PHBs utilized in handling routine messages, such as DMA messages and I/O error message, particularly in embodiments in which PHBs are integrated into a common integrated circuit chip with the processor. Accordingly, as discussed further herein below, the footprint of data structures implemented within PHBs can be reduced by an improved determination of the PE(s) affected by I/O messages, such as DMA and I/O error messages.

Figures 4A, 4B:
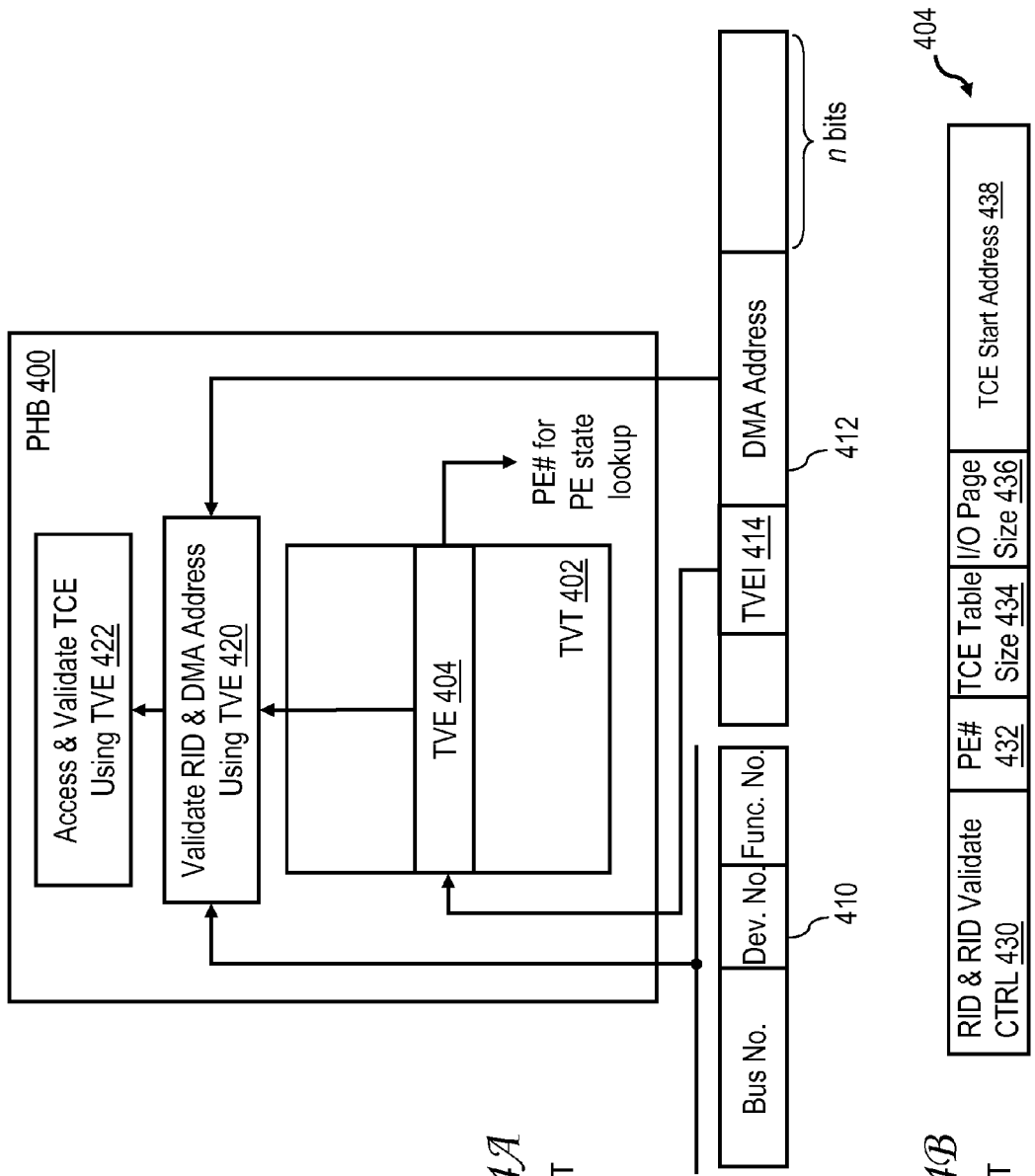
FIG. 4A depicts a conventional Peripheral Component Interconnect (PCI) host bridge (PHB)
FIG. 4B illustrates a conventional Translation and Validation Entry (TVE) of a Translation and Validation Table (TVT) in the PHB of FIG. 4A.

Referring now to FIG. 4A, there is depicted a conventional PHB 400 as described in U.S. Pat. No. 7,398,427, which is implemented in an integrated circuit chip separate from the processor. PHB 400 includes a wide data structure referred to as Translation and Validation Table (TVT) 402. TVT 402 includes a plurality of Translation and Validation Entries (TVEs) 404. As shown in FIG. 4B, each conventional TVE 404 comprises a number of fields including Requester ID (RID) and RID Validate Control field 430 specifying a RID and control information for validating the RID, a PE# field 432 indicating a PE associated with the RID, a Translation Control Entry (TCE) table size field 434, an I/O page size field 436, and a TCE table start address field 438 indicating the base address of the TCE table for the specified PE.

PHB 400 validates RIDs of Direct Memory Access (DMA) requests and translates RIDs to particular PEs by reference to TVT 402. As shown, PHB 400 receives a Direct Memory Access (DMA) packet including a RID 410 (which comprises a bus number, a device number and a function number) and a DMA address 412. Several bits of DMA address 412 form a TVE index (TVEI) 414 into TVT 402 that selects a particular TVE 404 for access. Once the TVE 404 is selected, the content of PE# field 432 is read out to determine the current state of the PE. In addition, the content of RID and RID Validate Control field 430 is compared with incoming RID 410 as shown at block 420. If RID 410 does not match the RID specified in field 430, PHB 400 does not permit the requested DMA operation to be performed. As indicated at block 422, PHB 400 also truncates the low order n bits of DMA address 412 (where $2^n$ is the I/O page size specified by I/O page size field 436 of the selected TVE 404) and compares the remaining DMA address bits below TVEI 414 with TCE table size field 434 of the selected TVE 404. If DMA address 412 specifies an address past the end of the relevant TCE table, PHB 400 disallows the DMA operation. If, on the other hand, the validations shown at block 420 and 422 are successful, PHB 400 performs the requested DMA operation utilizing the DMA address-to-real address translation contained in the in-memory TCE table for the PE, which is pointed to by the contents of TCE start address field 438.

It should be noted that the conventional TVE 404 depicted in FIGS. 4A-4B contains numerous multi-bit fields, and consequently conventional TVT 402 is a large data structure that requires considerable die area. In addition, each PE does not have use of TVEI field 414 of DMA address 412 for its own application, meaning that the DMA address space is carved into different discontiguous spaces for the various PEs.

Figures 5A, 5B:
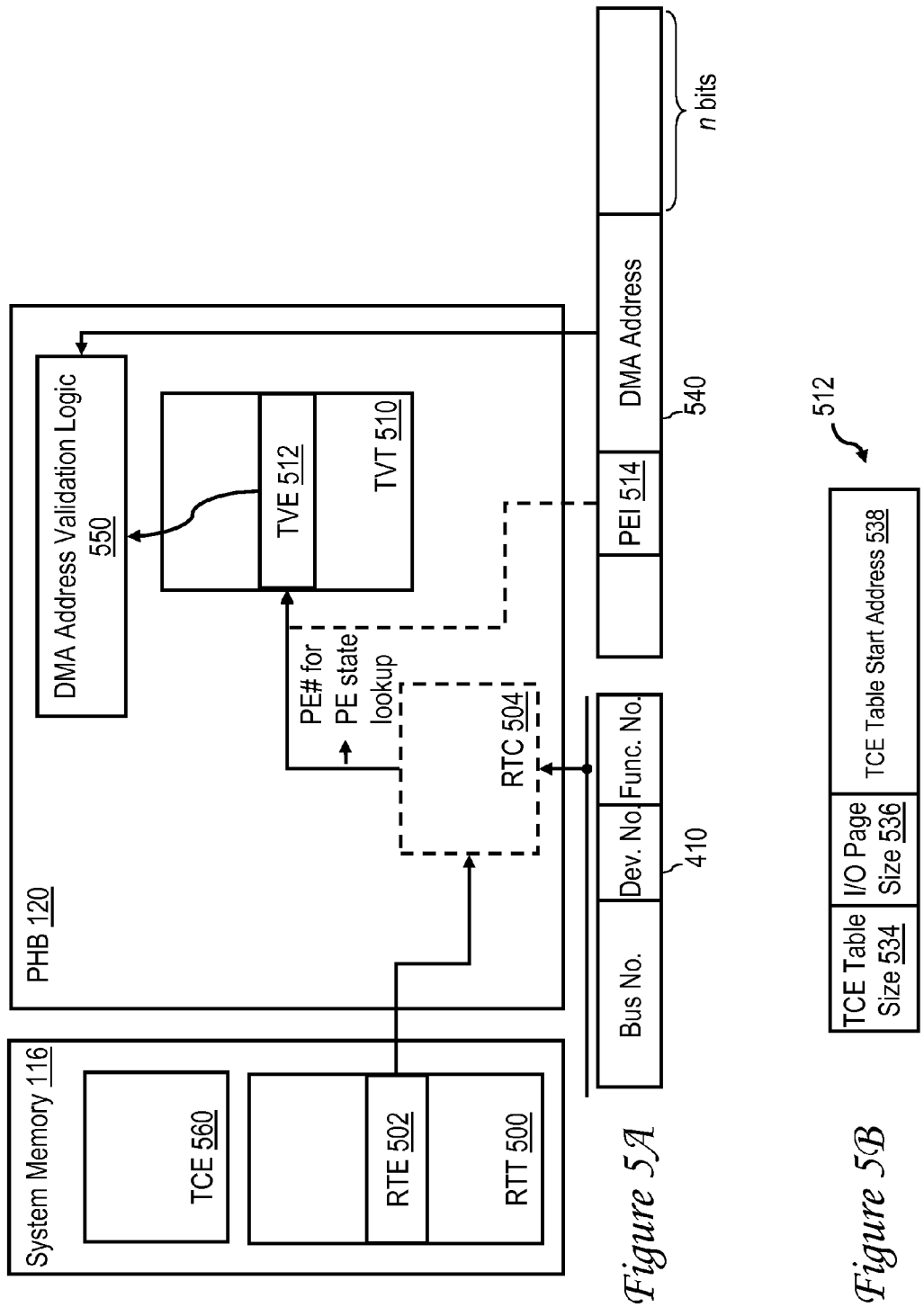
FIG. 5A depicts an improved Peripheral Component Interconnect (PCI) host bridge (PHB) in one exemplary embodiment.
FIG. 5B illustrates an improved Translation and Validation Entry (TVE) of a Translation and Validation Table (TVT) in the PHB of FIG. 5A.

With reference now to FIG. 5A, there is illustrated a more detailed view of an improved PHB 120 in accordance with one embodiment. In general, it is desirable to reduce the die area of PHB 120, particularly in preferred embodiments in which PHB 120 is integrated within the integrated circuit chip of processor 102 as shown in FIG. 1. One factor contributing to the reduction in the die area of PHB 120 is a reduction in the size of data structures within PHB 120 utilized to validate and translate DMA and I/O error messages received from various I/O components, such as IOAs 130, I/O bridges 312, and switches 310. Specifically, as detailed further below, the 16-bit RID field and PE# field formerly found in each conventional TVE 404 can be removed, leading to a significant reduction in the width of TVEs and a concomitant reduction in the overall footprint of the TVT and PHB 120.

In the arrangement shown in FIG. 5A, a RID Translation Table (RTT) 500, which may be populated and maintained, for example, by system firmware 204 based upon its allocation of I/O resources among LPARs 210, includes a plurality of RID Translation Entries (RTEs) 502. Each RTE 502 associates a respective RID, such as conventional 16-bit PCI RID 410, with a PE. RTT 500 can be implemented either in PHB 120, or more preferably, in an off-chip storage location, such as system memory 116. In embodiments in which RTT 500 is implemented off-chip, PHB 120 can optionally include a small on-chip RID Translation Cache (RTC) 504 to provide lower latency access to copies of the most recently accessed RTEs 502.

FIG. 5A further illustrates that PHB 120 includes a streamlined TVT 510 including a plurality of TVEs 512. As depicted in FIG. 5B, each TVE 512 comprises a small number of bit fields including a Translation Control Entry (TCE) table size field 534 indicating a table size of the TCE table 560 for the PE originating the DMA, an I/O page size field 536, and a TCE table start address field 538 indicating the base address of the in-memory TCE table 560 for the source PE. It should be noted upon comparison to FIG. 4B that TVEs 512 lack fields corresponding to conventional fields 430 and 432, resulting in a significant size reduction in TVT 510.

The operation of PHB 120 in servicing a DMA request will now be described with reference to FIGS. 5A-5B and with additional reference to the high level logical flowchart provided in FIG. 6. The process begins at block 600 and then proceeds to block 602, which illustrates PHB 120 receiving from one of the I/O components to which it is coupled a Direct Memory Access (DMA) operation including a conventional RID 410 and a DMA address 540. PHB 120 utilizes the RID 410 of the DMA operation to access a particular RTE 502, either from RTC 504 (if present) or from RTT 500 (block 604). The accessed RTE 502 specifies a PE, which PHB 120 utilizes to access the current state of the PE. PHB 120 also utilizes the PE# specified by the accessed RTE 502 to access TVT 510 (block 606). In some embodiments in which each PE has a single associated TVE 512, the PE# directly indexes into TVT 510. In alternative embodiments in which each PE may have one or more TVEs 512 (e.g., to enable multiple I/O page sizes for at least some PEs), then PHB 120 can additionally utilize one or more PE index (PEI) bits 514 from DMA address 540 to select between the multiple TVEs 512 associated with the selected PE. It should be appreciated that the use of PEI 514 does not carve up the DMA address space between different PEs, as does TVEI 414 of FIG. 4A, but only divides the DMA address space within the selected PE's address space, thus advantageously making the entire DMA address space available to each PE.

Figure 6:
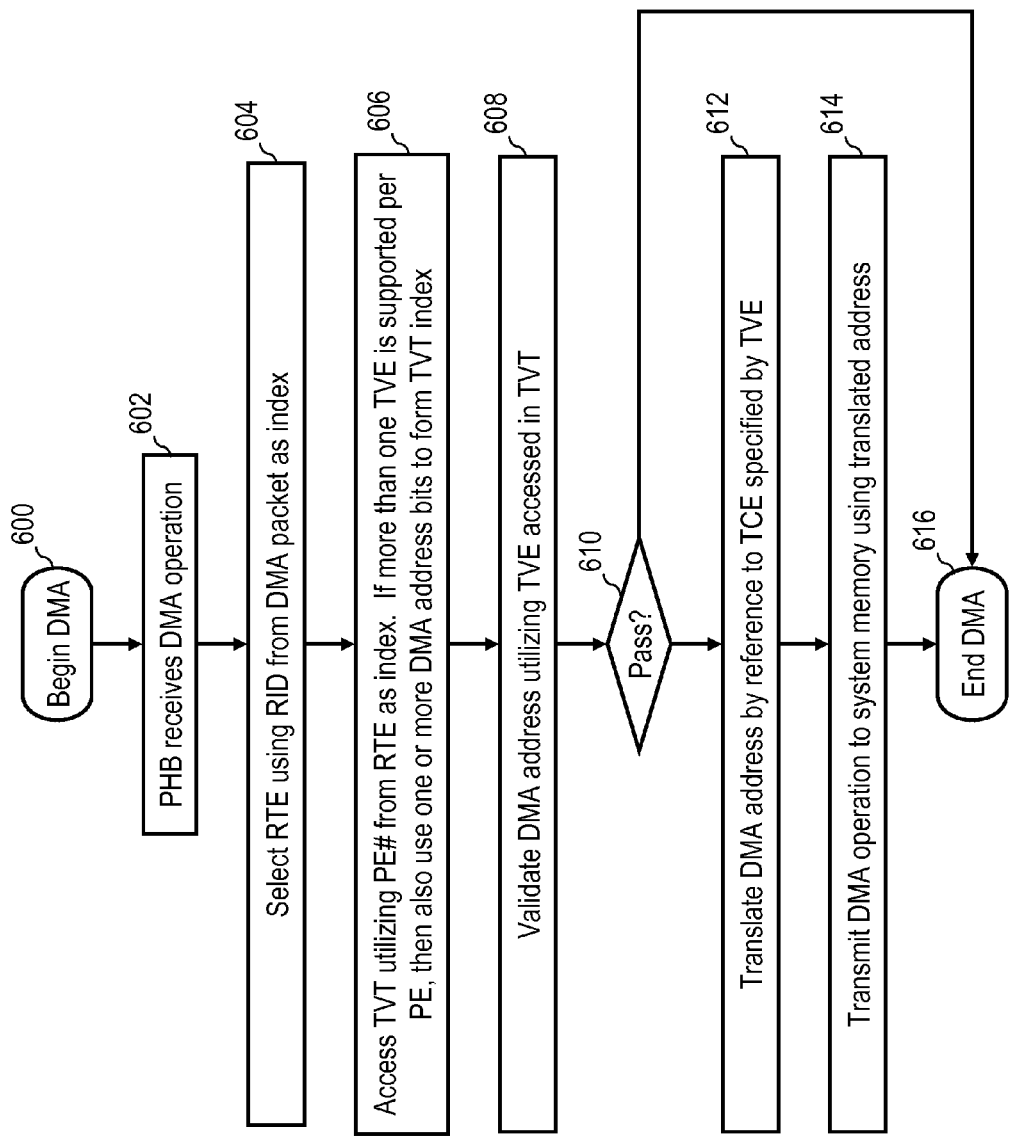
FIG. 6 is a high level logical flowchart of an exemplary process by which a PHB handles a DMA message in accordance with one embodiment.

Following block 606, the process of FIG. 6 proceeds to block 608, which depicts DMA address validation logic 550 in PHB 120 truncating the low order n bits of DMA address 540 (where $2^n$ is the I/O page size specified by I/O page size field 536 of the selected TVE 512) and comparing the remaining upper order DMA address bits with the contents of TCE table size field 534 of the selected TVE 512. As indicated at block 610, if DMA address 540 specifies an address past the end of the relevant TCE table 560, the validation fails, and PHB disallows the DMA operation as indicated by the process terminating at block 616. If, on the other hand, DMA address 540 passes validation, as indicated by a positive determination at block 610, PHB 120 translates DMA address 540 to a real address in system memory 116 (block 612). In one embodiment, PHB 120 performs the address translation by reference to the in-memory TCE table 560 utilizing the particular TCE therein pointed to by an address formed by combining the contents of TCE table start address field 538 of the selected TVE 512 and the mid-order bits of DMA address 540 between PEI 514 and the n low-order address bits. PHB 120 then transmits the DMA operation to the IMC 114 of the target system memory 116 using the system memory (e.g., real) address obtained by the address translation in order to invoke performance of the requested DMA operation (block 614). Thereafter, the process shown in FIG. 6 terminates at block 616.

A similar technique for providing isolation between PEs while minimizing the size of data structures in PHBs 120 is also applicable to the isolation of I/O error messages, as discussed further below with reference to FIGS. 7A-7B, 8A-8B and 9.

Figure 7A:
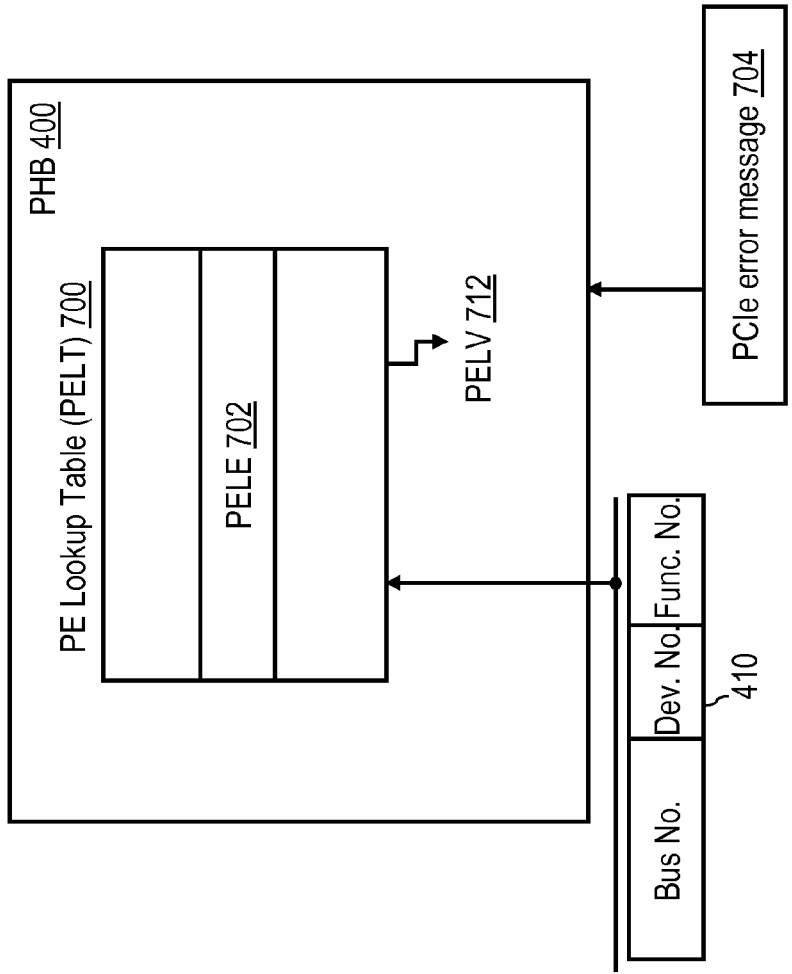
FIG. 7A depicts a conventional Peripheral Component Interconnect (PCI) host bridge (PHB) including a PE lookup table (PELT) in accordance with the prior art.
Figure 7B:
FIG. 7B illustrates a conventional PE Lookup Entry (PELE) of the PELT in the prior art PHB of FIG. 7A.

With reference first to FIG. 7A, there is illustrated a second view of conventional PHB 400 of FIG. 4A that depicts the data structure utilized in handling I/O (e.g., PCIe) error messages in the prior art. As shown, in addition to the data structures previously discussed, PHB 400 includes a wide data structure referred to as PE Lookup Table (PELT) 700. PELT 700, which is implemented in expensive content-addressable memory (CAM), includes a plurality of PE Lookup Entries (PELEs) 702. As shown in FIG. 7B, each conventional PELE 702 comprises Requester ID (RID) and RID Validate Control field 710 specifying a RID and control information for validating the RID, as well as a PE Lookup Vector (PELV) field 712 indicating by set bits (e.g., 1's) which PE number(s) are affected by the I/O error.

In the prior art, PHB 400 receives a PCIe error message 704 together with a RID 410 identifying which I/O component is the source of PCIe error message 704. In response, PHB 400 utilizes RID 410 to perform a CAM access to PELT 700 to identify a matching PELE 702 containing a matching RID in its RID and RID Validate Control field 710. PHB 400 then processes the PCIe error message for each PE specified by the PELV field 712 of the matching PELE 702.

Figures 8A, 8B:
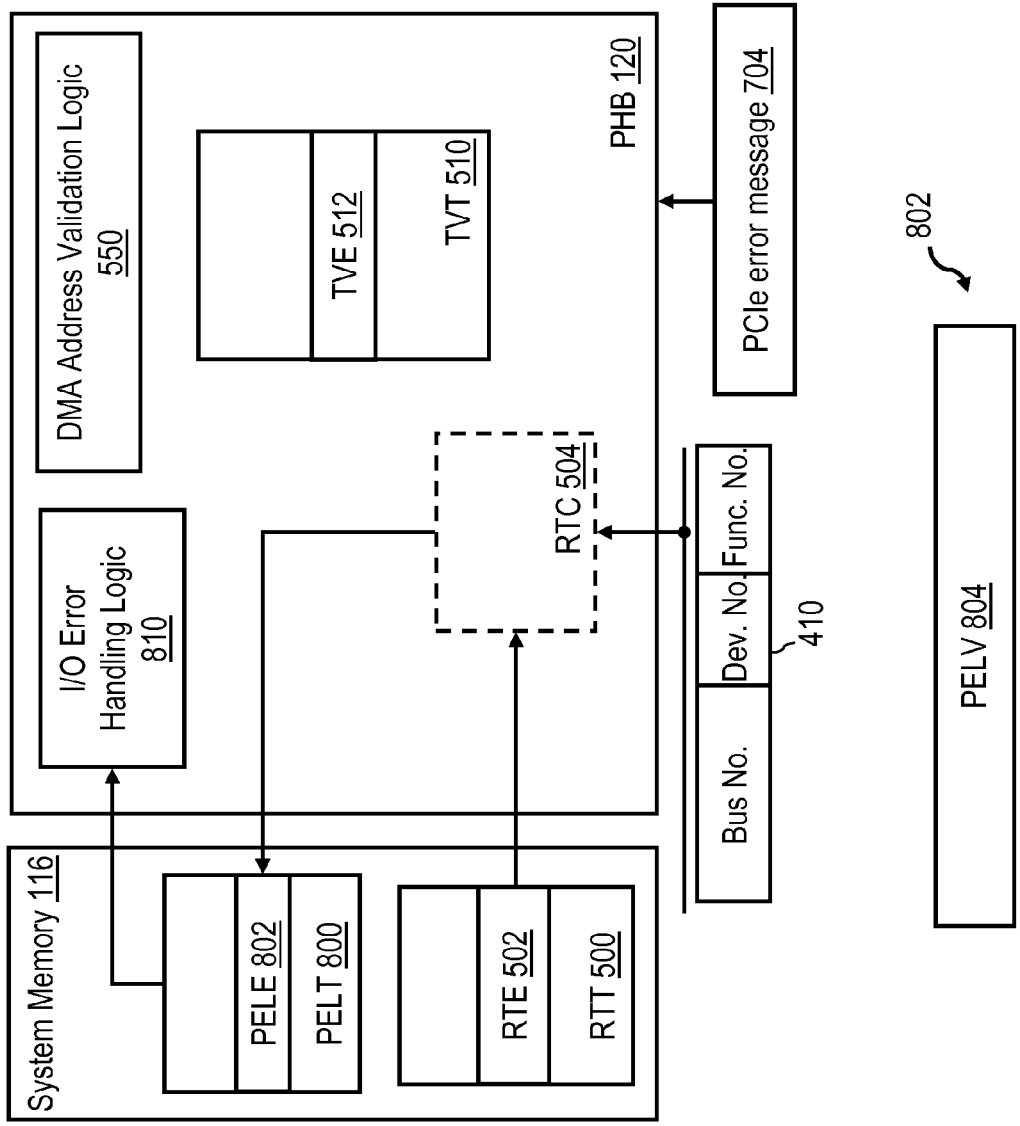
FIG. 8A depicts an improved Peripheral Component Interconnect (PCI) host bridge (PHB) in one exemplary embodiment.
FIG. 8B illustrates an improved PE Lookup Entry (PELE) utilized by the improved PHB of FIG. 8A.

Referring now to FIG. 8A, there is depicted a more detailed view of an improved PHB 120 in accordance with one embodiment. As noted above, it is desirable to reduce the die area of PHB 120, particularly in preferred embodiments in which PHB 120 is integrated within processor 102 as shown in FIG. 1. One factor contributing to the reduction in the die area of PHB 120 is the elimination of the RID field found in each conventional PELE 702, leading to a significant reduction in the width of PELEs and a concomitant reduction in the overall footprint of PHB 120. It is further desirable to reduce or eliminate utilization of expensive CAM, such as that utilized to implement conventional PELT 700.

Consequently, in the arrangement shown in FIG. 8A, RTT 500, which is preferably implemented in system memory 116, is again utilized to associate each possible RID that may be received by PHB 120, such as conventional 16-bit PCI RID 410, with a PE. As noted above, to reduce access latency in embodiments in which RTT 500 is implemented off-chip, PHB 120 can optionally include a small on-chip RTC 504 to provide lower latency access to copies of the most recently accessed RTEs 502.

FIG. 8A further illustrates that system memory 116, which is preferably implemented with a low cost non-CAM technology (e.g., DRAM), preferably implements a streamlined PELT 510 including a plurality of PELEs 802. As depicted in FIG. 8B, each PELE 802 comprises a PELV 804 containing a plurality of bits each corresponding to a respective one of a plurality of PE numbers. As described above, PELV 804 identifies with one or more set bits (e.g., 1's) the PE(s) against which an error occurring a given RID should be processed. Multiple PEs can be implicated in an error, for example, if the error related to an I/O component coupled to multiple PEs (e.g., a switch 310) or to multiple functions associated with a single device (e.g., multiple ports of an IOA 130). It should be noted that PELEs 802 lack a field corresponding to conventional field 710, resulting in a significant size reduction in PELT 800.

Figure 9:
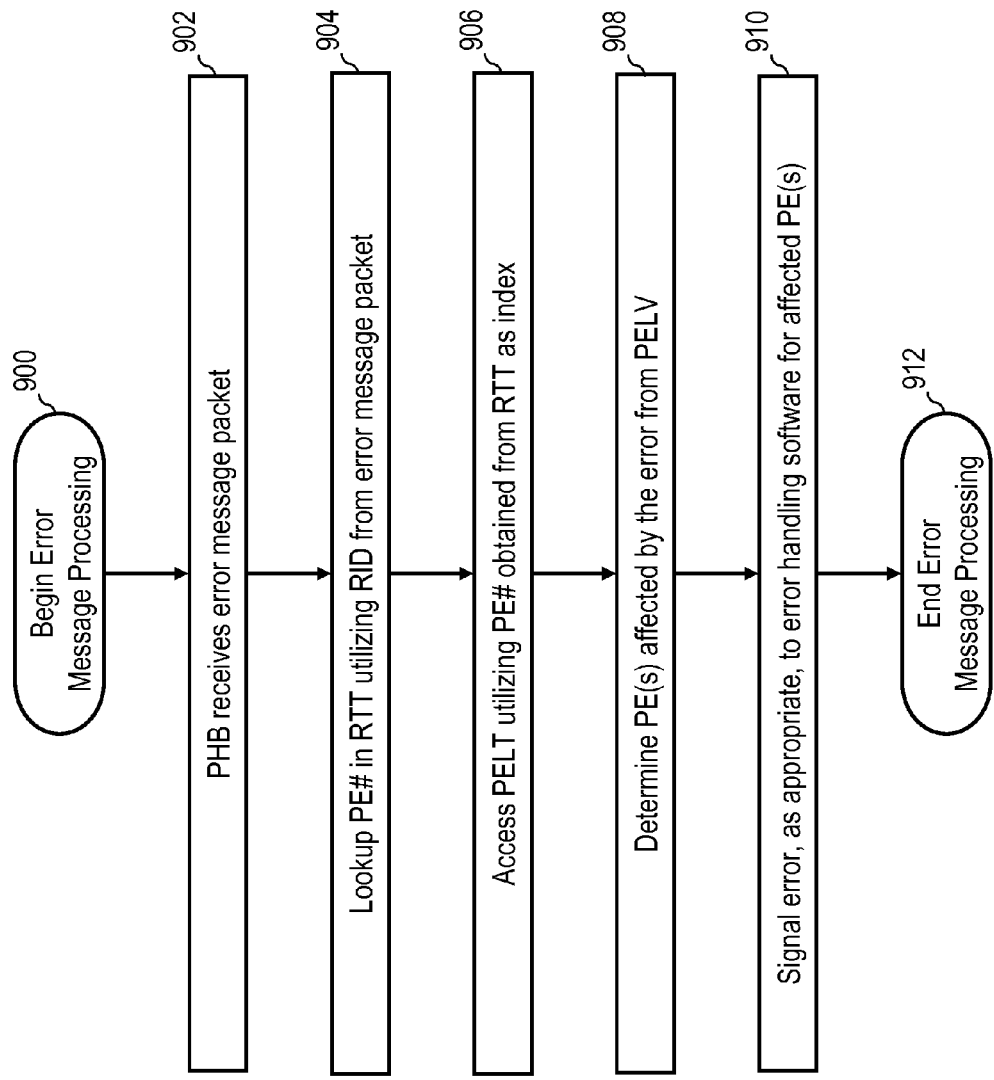
FIG. 9 is a high level logical flowchart of an exemplary process by which a PHB handles an I/O error message in accordance with one embodiment.

The operation of PHB 120 in handling an I/O error message will now be described with additional reference to the high level logical flowchart provided in FIG. 9. The I/O error message handling process begins at block 900 and then proceeds to block 902, which illustrates a PHB 120 receiving an I/O error message packet containing an error message 704 and a RID 410 identifying the source of the I/O error message. PHB 120 utilizes the RID 410 of the I/O error packet to access a particular RTE 502, either from RTC 504 (if present) or from RTT 500 (block 904). The accessed RTE 502 specifies a PE#, which PHB 120 utilizes as a direct index to access PELT 800 (block 906). It should be noted that since a direct index into PELT 800 is available, it is not necessary to implement PELT 800 in expensive CAM.

Next, at block 908, PHB 120 determines which PEs are affected by the I/O error by examining which bit or bits are set in the PELV field 804 of the selected PELE 802 in PELT 800. In response to the determination of the affected PE(s), I/O error handling logic 810 in PHB 120 signals the I/O error as appropriate to only the error handling software (e.g., device driver software of one or more OSs 212) responsible for handling errors for the affected PE(s) (block 910). The error handing process then completes at block 912.

As has been described, in one embodiment, a data processing system includes a processor core, a system memory including a first data structure including a plurality of entries mapping requester identifiers (IDs) to partitionable endpoint (PE) numbers, and an input/output (I/O) subsystem including a plurality of PEs each having an associated PE number, where each of the plurality of PEs including one or more requesters each having a respective requester ID. An I/O host bridge, responsive to receiving an I/O message including a requester ID and an address, determines a PE number by reference to a first entry from the first data structure, and responsive to determining the PE number, accesses a second entry of the second data structure utilizing the PE number as an index and validates the address by reference to the accessed entry in the second data structure. The I/O host bridge, responsive to successful validation, provides a service indicated by the I/O message.

The foregoing description has been presented for purposes of illustration and elaboration, and is not intended to be exhaustive or limited to the structures and processes disclosed. Many modifications and variations will be apparent to those of ordinary skill in the art. Various embodiments were chosen and described in order to best explain the principles of operation, the practical application, and to enable others of ordinary skill in the art to understand and apply the disclosed teachings in various embodiments with any modifications suitable for the particular use contemplated.

While the present invention has been particularly shown as described with reference to one or more preferred embodiments, it will be understood by those skilled in the art that various changes in form and detail may be made therein without departing from the spirit and scope of the invention. For example, while the present invention has been described in the context of a fully functioning data processing system, those of ordinary skill in the art will appreciate that the processes of the present invention are capable of being distributed in the form of a computer program product including a computer readable storage medium having program code stored therein. Examples of computer readable storage media include hard disk drives, RAM or other volatile memory, non-volatile memory, and optical storage media.

What is claimed is:

1. A method of data processing in a data processing system having a system memory and an input/output (I/O) subsystem including at least one I/O host bridge and a plurality of partitionable endpoints (PEs) each having an associated PE number, each of the plurality of PEs including one or more requesters each having a respective requester identifier (ID), the method comprising:
   receiving an I/O message at an I/O host bridge, the I/O message including a requester ID and an address;
   in response to receiving the I/O message, the I/O host bridge accessing a first entry from a first data structure that resides in the system memory utilizing the requester ID and determining a PE number of a PE affected by the I/O message by reference to content of the first entry;
   storing a plurality of entries in a second data structure within the I/O host bridge, wherein each of the plurality of entries is associated with a respective index among multiple indices;
   in response to determining the PE number from the first entry, the I/O host bridge accessing a second entry among the plurality of entries in the second data structure and validating the address by reference to the second entry in the second data structure, wherein accessing the second entry includes selecting as the second entry one of the plurality of entries having an associated index matching the PE number determined from the content of the first entry; and
   in response to successful validation of the address, the I/O host bridge providing a service indicated by the I/O message.

2. The method of claim 1, wherein:
the I/O message is a direct memory access request (DMA) request; and
the method further comprises translating the address into a system memory address.

3. The method of claim 1, wherein the I/O host bridge comprises a PCI host bridge.

4. The method of claim 1, wherein the I/O host bridge determining a PE number of a PE affected by the I/O message by reference to a first entry comprises accessing the first entry in a cache in the I/O host bridge that buffers entries from the first data structure.

5. The method of claim 1, and further comprising selecting the second entry from among multiple entries of the second data structure associated with the PE number by reference to an index in the address.

6. A data processing system, comprising:
a processor core;
a system memory coupled to the processor core, the system memory including a first data structure including a plurality of entries mapping requester identifiers (IDs) to partitionable endpoint (PE) numbers; and
an input/output (I/O) subsystem coupled to the processor core, the I/O subsystem including:
   a plurality of PEs each having an associated PE number, each of the plurality of PEs including one or more requesters each having a respective requester ID; and
   an I/O host bridge including a second data structure including a plurality of entries each associated with a respective index among multiple indices, wherein the I/O host bridge, responsive to receiving an I/O message including a requester ID and an address, accesses a first entry from the first data structure in the system memory utilizing the requester ID and determines a PE number of a PE affected by the I/O message by reference to content of the first entry, and responsive to determining the PE number, accesses a second entry among the plurality of entries in the second data structure in the I/O host bridge and validates the address by reference to the second entry in the second data structure, wherein the I/O bridge selects as the second entry one of the plurality of entries having an associated index matching the PE number determined from the content of the first entry, and wherein the I/O host bridge, responsive to successful validation of the address, provides a service indicated by the I/O message.

7. The data processing system of claim 6, wherein the I/O message is a direct memory access request (DMA) request.

8. The data processing system of claim 6, wherein the I/O host bridge comprises a PCI host bridge.

9. The data processing system of claim 6, wherein:
the I/O host bridge includes a cache of entries from the first data structure in system memory; and
the I/O host bridge stores the first entry in the cache.

10. The data processing system of claim 6, wherein:
the second data structure holds multiple entries associated with the PE number; and
the I/O host bridge selects the second entry from among the multiple entries associated with the PE number by reference to an index in the address.

11. The data processing system of claim 6, and further comprising an integrated circuit chip including the processor core and the I/O host bridge.

12. A processor for a data processing system having a system memory and an input/output (I/O) subsystem including a plurality of partitionable endpoints (PEs) each having an associated PE number, each of the plurality of PEs including one or more requesters each having a respective requester identifier (ID), the processor comprising:
a processor core; and
an I/O host bridge including a second data structure including a plurality of entries each associated with a respective index among multiple indices, wherein the I/O host bridge, responsive to receiving an I/O message including a requester ID and an address, accesses a first entry from a first data structure in the system memory utilizing the requester ID and determines a PE number of a PE affected by the I/O message by reference to content of the first entry, and responsive to determining the PE number, accesses a second entry from among the plurality of entries in the second data structure in the I/O host bridge and validates the address by reference to the second entry in the second data structure, wherein the I/O bridge selects as the second entry one of the plurality of entries having an associated index matching the PE number determined from the content of the first entry, and wherein the I/O host bridge, responsive to successful validation of the address, provides a service indicated by the I/O message.

13. The processor of claim 12, wherein the I/O message is a direct memory access request (DMA) request.

14. The processor of claim 12, wherein the I/O host bridge comprises a PCI host bridge.

15. The processor of claim 12, wherein:
the I/O host bridge includes a cache of entries from the first data structure in system memory; and
the I/O host bridge stores the first entry in the cache.

16. The processor of claim 12, wherein:
the second data structure holds multiple entries associated with the PE number; and
the I/O host bridge selects the second entry from among the multiple entries associated with the PE number by reference to an index in the address.

17. The processor of claim 12, and further comprising an integrated circuit chip including the processor core and the I/O host bridge.

* * * * *